United States Patent Office 3,754,067
Patented Aug. 21, 1973

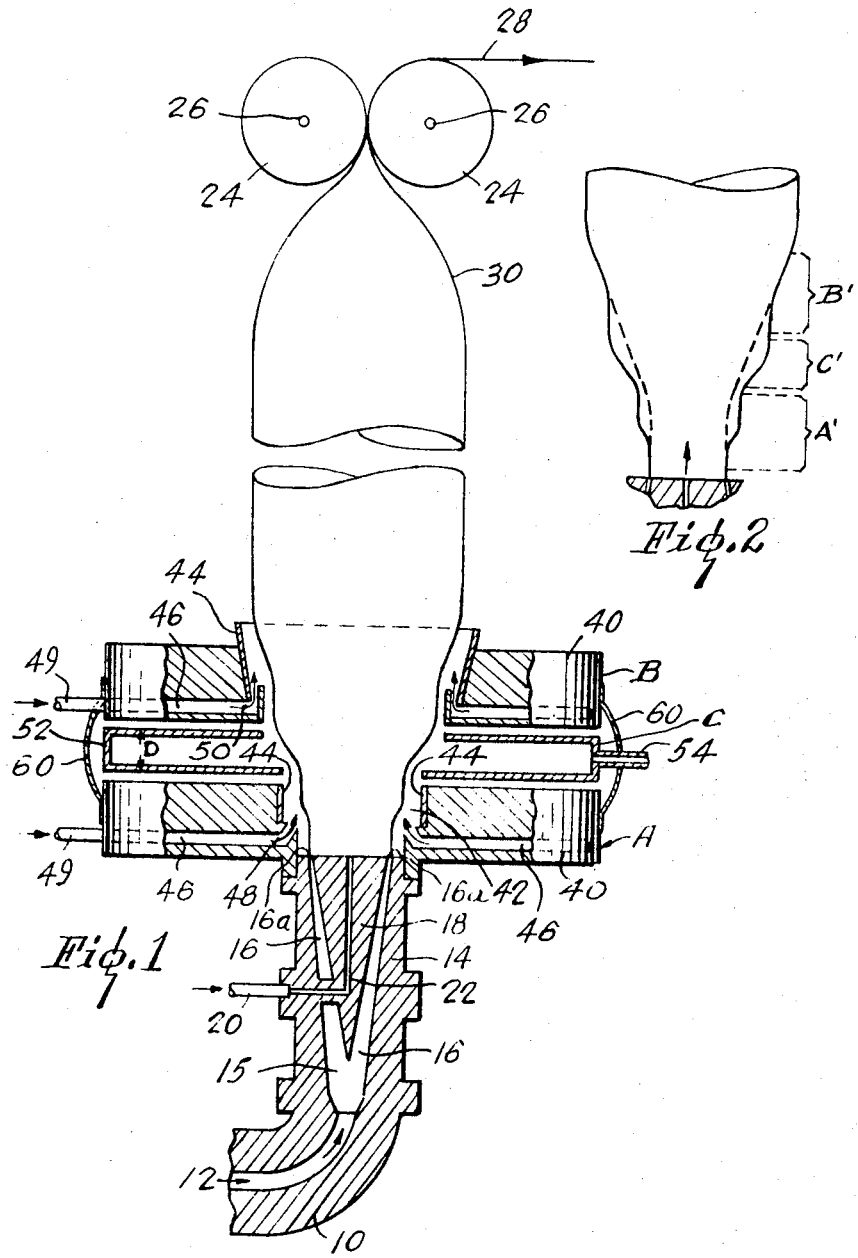

3,754,067
BLOWN TUBE PRODUCTION
Daniel R. St. Eve, Thornhills, Ontario, and Ajit Kumar Bose, Don Mills, Ontario, Canada, assignors to Leco Industries Limited, St. Laurent, Quebec, Canada
Filed Oct. 12, 1970, Ser. No. 79,754
Int. Cl. B29c 25/00; B29d 23/04; B29f 3/08
U.S. Cl. 264—89                                10 Claims

ABSTRACT OF THE DISCLOSURE

The invention provides a novel process for producing, by the blown tube process, film having improved and balanced characteristics. The improved film is characterized by crystallites dispersed throughout the film in amorphous areas and which is substantially free of crystalline formations, as well as having improved other properties. The process disclosed employs, the steps of acting on a molten tube following extrusion to cool it to a temperature above the crystalline formation temperature, followed by an annealing step and a solidification step. The apparatus for the process includes first cooling means, in annnealing and a further cooling chamber or means.

---

This invention relates to film and tubing.

More particularly, one aspect of this invention relates to novel film and tubing; another aspect to an improved method of producing film and tubing; and a still further aspect to an improved apparatus for carrying out such a method and for producing film and tubing.

In the present specification, for ease of understanding and description of and illustration of the invention, reference will be made to polyethylene as a typical extrudable film-forming thermoplastic resin, since it is one of the most common materials in use today for such purposes; however, it will be understood that the invention is not limited thereto, as described hereinafter.

Film and tubing of polyethylene, and other similar materials, finds many uses in various and diversified fields, e.g. the packaging art, the construction industry, etc. Depending on its particular use, different properties are required; for example, in the packaging field, some uses require the material to be "shrinkable"—e.g. in shrink packaging where a wrapper or label is applied to a commodity so that it assumes the contour of the commodity after a film- or tube-shrinking treatment. Other requirements for film or tubing either alone or in combination with the "shrink" characteristics, include high gloss (optical) and/or low haze (frostiness), usually together with good tensile strength, good elongation, good secant modulus and good impact strength properties.

The above characteristics are well defined in the art and briefly summarized, the term "shrink" or "shrinkable" describes film or tubing capable of being shrunk in overall area upon suitable activation—e.g. normally by heat treatment (which is generally carried out after the film or tubing is placed in situ—e.g. about an article or commodity). Low haze characteristics of a product are highly desirable, as otherwise the transparency of the tube or film is impaired making it of limited value. High gloss is desirable in other products to provide a commercially desirable appearance. The tensile strength of film and tubing must also be sufficient to withstand normal handling in use without rupturing. The secant modulus, tied in with the impact strength characteristic, must be sufficient so that the film or tubing has good stiffness, but yet is flexible enough to permit use for packaging, etc. In the case of impact strength, the film or tubing must have sufficient characteristics to enable it to be handled and used without rupturing due to brittleness, and for being "contoured" about a product.

Several of the above characteristics are influenced by the fact that polyethylene resin, when manufactured, as with other similar materials, possesses a degree of crystallinity which varies according to the type of process (e.g. batch, "J-type" reactor) by which it was produced. In homopolyethylene of a low density type, the degree of crystallinity will be, e.g., between 50–60%.

Conventionally, a large percentage of film and tubing is made by what is known in the art as the "blown tube" or "blown bubble" method. The actual details are well known to those skilled in the art and reference may be had to, e.g., Canadian Patent 460,963 illustrating such a method. Briefly, the method involves extrusion of an extrudable film-forming resin, using an extruder, through an extrusion die to form a bubble or tube, which is then blown up (using a differential air pressure between the interior of the bubble and atmosphere) to a desired size. The bubble or tube may be slit after solidification to form film (sheeting). In the conventional process, the molten bubble after extrusion is acted on by a single cooling means.

The properties of blown tubing or film or polyethylene vary considerably (depending on various extrusion conditions—e.g. melt temperature). Even operating under optimum conditions for any given property desired, the properties of, e.g. low density polyethylene may be generally stated to result in a haze percentage of 6 to 8% (measured by ASTM test D–1003–61; excellent being 0–5%, good being 5–10% and poor being 10% and higher); gloss percentage of 90 to 100% (measured by ASTM test D–523–53T; excellent being 90–105%, good being 75–89%, and poor being 88% and lower); tensile strength averages of between 2000 to about 2800 p.s.i. (based on an average of machine direction and transverse direction; values of 2000 to 2900 p.s.i. being excellent; good being 1700 to 2000 p.s.i., and poor being below 1700 p.s.i.); a secant modulus of about 30,000 (excellent being 29,000 to 31,000); impact strengths of about 60 grams/mil (one mil thickness) (excellent being 56–64 grams/mil) and shrink characteristics where the ratio of machine direction (MD) to transverse direction (TD) is between about 8:1 to about 5:1, with averages of 70% shrinkability in the MD and 20 to 30% in the TD. With the tensile strength characteristics (like the shrink feature) the blown tube or film normally has a far greater strength in the machine direction as opposed to the transverse direction, e.g. 2800 p.s.i. compared to 2300 p.s.i.

It is known to those skilled in the art the improved gloss characteristics (within 90 to 105%) and haze (4–5%) can be obtained by increasing the melt temperature of the extruder and by increasing the frost line height of the blown tube; however, by dosing so, there is a resulting large drop in the tensile strength, secant modulus and the impact strength characteristics of such films. Conversely, the tensile strength, impact strength and secant modulus of the product can be increased but only at the expense of the haze characteristics (to between about 10 to 20%) and gloss characteristics (between 75 to 89%).

Conventional blown tubing or film likewise can be produced, according to existing technology, where there is a vast differential between the shrink characteristics in the transverse direction as opposed to the machine direction (the direction in which the tube is extruded from the extruder and wound up). This is due to an inherent characteristic of the blown tube process, in that the molten tube must be stretched longitudinally (in the machine direction) between 5 to 8 times that which the bubble is transversely expanded (using a differential air pressure) in order to obtain a stable bubble during production; and further by using a blow ratio of at least 1.5:1. Consequently, such film or tubing when shrunk will preferentially shrink in the machine direction, which of course necessitates corresponding allowances in dimensions for packaging purposes, etc. Still further, it is very difficult to provide shrink film containing indicia which when shrunk, will produce a product having clear and legible indicia thereon.

Optimum characteristics for versatile tube or film would desirably be a haze percentage of between about 0 to 5%, gloss characteristics of 90 to 105%, tensile strength average of about 3,000 p.s.i. (with the strength in both the machine direction and transverse direction being substantially equal), a secant modulus of about 30,00 and an impact strength of at least 60 grams/mil (one mil thickness).

Likewise, optimally, the shrink characteristics of film or tubing should be such that the machine direction and transverse direction characteristics are substantially identical.

Many attempts and a large amount of research have gone into trying to improve and balance the properties of film and tubing without sacrificing one or more other properties—for example, post treatments of film have been attempted, but generally the tensile strength is lowered as a result or other properties are sacrificed. However, in general, none of the processes are very successful.

With this invention, applicant has developed a very simple, economical and practical process for producing film and tubing, using the blown tube process, which overcomes the disadvantages of the prior art processes and at the same time provides improved properties in the film or tubing.

According to one aspect of the present invention, in the method of producing film or tubing wherein an extrudable film-forming thermoplastic resinous material is extruded to form a molten tube or bubble by the blown tube process, and wherein the molten extruded tube is blown up to a desired size following extrusion, there is provided the improvement comprising the steps of acting on the molten tube following extrusion, to cool the molten tube to a temperature above the crystallization formation temperature of the material, subsequently annealing the molten tube for a time sufficient to permit the material to form amorphous areas therein, and thereafter causing the resulting molten annealed tube to solidify.

According to a further aspect of the present invention, in an apparatus suitable for producing film or tubing by the blown tube method, and wherein there is included at least one extruder, an extrusion die and means for causing a molten extruded tube to be blown up to a desired size following extrusion, there is provided the improvement comprising first cooling means adapted to cool a molten tube of material extruded from said die, said cooling means being adapted to be mounted in operative relationship to said die whereby a molten extruded tube is cooled by said cooling means after extrusion from said die, an annealing chamber in operative association with said first cooling means in which a cooled molten tube is annealed, and further cooling means in operative association with said annealing chamber for further cooling the annealed molten tube.

According to a still further aspect of the present invention, there are also provided new polyethylene products; which in one embodiment is solidified amorphous polyethylene film or tubing having x'lytes dispersed throughout said film in said amorphous areas, the film being substantially free of crystalline polyethylene; and in a still further embodiment an extruded polyethylene film or tubing having a more balanced machine direction:transverse direction ratio—e.g. between about 2:1 to about 1:1, the film being further characterized by a tensile strength average of the machine and transverse directions of at least 2800 p.s.i. haze properties as measured by ASTM D–1003–61 of less than about 4% and gloss characteristics as measured by ASTM D–523–53T of at least 115.

Following the teachings of the process of the present invention, there may be obtained film and tubing having improved properties by a very simple and economical method as compared to the proposed solutions of the prior art. The process of the present invention lends itself to adaptation on existing blown tube type of equipment provided with modifications as described herein. The process may also be carried out at rates of film and tubing production, while maintaining the improved characteristics of the products, superior to any other proposed method for obtaining products by the blown tube method, having only one or two of the characteristics desired in the product. A still further advantage of the process of the present invention is that no extra steps are required to produce film having improved characteristics as in prior art proposals.

Without being limited to any theory, the process of the present invention treats the molten material to first cause the formation of x'lytes and permits the formation of amorphous material surrounding the x'lytes whereafter the molten film is cooled to solidify the material substantially without any crystalline formation. During the formation of the x'lytes most of the expansion of the molten tube is carried out which aids in the formation of a substantially uniform distribution and spacing of the x'lytes which appear to have amorphous areas surrounding the x'lytes—i.e. during expansion, the x'lytes are stretched in both machine and transverse directions. The term "x'lytes" as used herein is the art recognized equivalent of the term "crystallites" as stated for example in the French-English Science Dictionary of Louis de Vries (Iowa State University) by McGraw-Hill, page 532, and as used herein shall represent crystallites.

The step of x'lyte formation is preferably substantially accomplished during the first cooling step, and is substantially completed following annealing of the molten material. In some cases, it may be desirable to cause x'lyte formation following initial cooling of the molten material—i.e. during the annealing stage, in which embodiment, the annealing stage will also include slight cooling action.

In all cases, the temperature of the molten material during the initial cooling and annealing stages is maintained above the crystalline formation temperature of the material being extruded, and desirably within a temperature range of from about 30° F. below the temperature at which the material is extruded but above the crystalline formation temperature of the material. As will be appreciated, the temperature may vary according to the specific type of material being used in the process, but generally speaking for polyethylene and other similar polymers or copolymers, the material will be cooled to between about −20° F. to about −100° F. from the temperature at which the material is extruded. The x'lyte formation temperature—that is the temperature at which x'lytes form in the material will vary depending on the particular material being used. These temperatures for different materials are known to those skilled in the art or may be readily determined. In the case of low density polyethylene, temperatures conducive to formation of x'lytes, using a melt temperature of 320 to 350° F. are between about 290 to 320° F., which will vary depending on the specific type of resin used as the starting material.

The initial cooling step may be carried out by any suitable means, as for example by an externally applied gaseous cooling medium (typically air, having an appropriate temperature), solid cooling means—e.g. a cooling ring again having the appropriate temperature, etc. As will be understood by those skilled in the art, the temperature of the first means used to cause cooling in the first cooling step will vary depending on factors such as extrusion speed of the film, melt temperature, etc. Preferably, the first cooling step is carried out using air as a gaseous cooling medium and under conditions such as minimum volume of air having a medium velocity is employed. Following this procedure, the gaseous cooling medium will also impart stability to the bubble.

During the first cooling step, and employing the conventional blown tube procedures, the molten tube will partially expand during the step. Thus, x'lytes formed in the material will be subject to machine and transverse direction expansion.

The second step of annealing molten material is preferably carried out so that there is a minimum of disturbance created on the molten bubble. During the annealing step, heat is removed from around the molten bubble, which can expediently be accomplished by creating a partial vacuum externally surrounding the molten bubble. It has been found that where x'lyte formation is permitted to occur during the first cooling step, the annealing step will permit amorphous areas to form and grow around the x'lytes. However, as previously mentioned, x'lyte formation may take place in the annealing stage by causing a slight cooling action of the molten bubble.

Desirably, the annealing step is carried out at a point removed from the first cooling step in the direction of travel of the molten tube.

Applicant has found, in accordance with this invention that by employing a vacuum step in the annealing operation, additional stability is imparted to the bubble as will be hereinafter explained, and further that the bubble is permitted to expand by virtue of the partial vacuum which is believed to impart the additional stability.

In the next step according to the present invention, the annealed molten product is subsequently permitted to solidify preferably by passing the molten tube through a further cooling step, whereby the molten material is transformed into a solidified tube substantially without the formation of any crystalline structures therein. During this last step, the molten tube is further expanded to the desired size. Preferably, the last cooling step is carried out as a quench step, using a high volume low velocity gaseous cooling medium, e.g. air. Desirably, the last cooling step is carried out at a point removed from the annealing stage.

In effect, applicant has found that the process of the present invention acts as a type of double extrusion process, wherein following extrusion, the molten tube is expanded to a first blow ratio size, wherein the molten tube is cooled to initiate the formation of x'lytes while smoothing out any melt irregularities. Thereafter, following annealing wherein preferably only the sensible heat load is transferred to the atmosphere, the tube is subsequently expanded to the desired low ratio size using a fast cooling step. In the final expansion, unlike the conventional blown tube process wherein molten material is extruded and which encounters die resistance, the present process permits expansion under virtually neutral or relaxed melt conditions, whereby the final blow ratio is a combination of the initial and final expansion stages.

The process of the present invention is preferably carried out in an enclosed area whereby undesirable influences on the molten tube are eliminated. To this end, the first cooling step, the annealing step and the final cooling step may be carried out in a closed housing surrounding the molten tube at the appropriate positions.

Applicant has further found that desirably, the combined minimum blow ratio that should be employed for best properties in the extruded film is about 2.5, while blow ratios of 3.5 impart better balanced properties in the products while permitting higher outputs having good bubble stability during production.

It will be understood that during the first and final cooling steps, there may be employed more than one cooling stage to impart the desired degree of cooling to the molten bubble. However, this is not normally necessary as a single cooling stage can usually be employed to accomplish the desired cooling.

In carrying out the process of the present invention the apparatus according to a further aspect may include any suitable first cooling means adapted to cool the molten tube, following extrusion, to the desired temperature. Conventionally, such cooling means comprise means for supplying a gaseous cooling medium to the external surface of the tube, with suitable means for controlling the degree (amount) and velocity of the cooling medium. Desirably, the first cooling means is of a substantially similar construction to that hereinafter described with respect to the second cooling means.

Suitable means may be provided for mounting the primary cooling means to the extrusion device, preferably at a point slightly removed from the point at which the molten material is extruded as an annular tube—i.e. from the extrusion die.

The annealing chamber may be in the form of an enclosed chamber having means for withdrawing the sensible heat load from the atmosphere surrounding the molten tube. In a preferred embodiment, the annealing chamber comprises an annular housing surrounding the tube with apertures therein adapted to permit the passage of the molten tube through the chamber, and with means for creating a partial vacuum in said chamber to permit the sensible heat load to be removed. It will be understood that the diameter of the apertures of the annealing chamber will be sufficient to encompass the annular tube, and preferably one-half to one and one-half inches greater. Any suitable means may be employed for drawing a partial vacuum in the annealing chamber, such suitable means being, for example, an air pump. The air pump may be connected to the annealing chamber by means of one or more conduits. Preferably, the air pump will have control to permit greater or lesser amounts of air to be withdrawn from the annealing chamber to allow for variances in the size and type of tube or film production.

The length of the annealing chamber may vary, and if desired, the housing may be made adjustable to compensate for various dwell time of the molten tube. The dwell times will be determined by the type of material being employed, the diameter of the tube, etc., and may be readily ascertained by those skilled in the art. Preferably, the annealing chamber is mounted at a position slightly spaced from the first cooling means, and to this end, any suitable mounting means may be employed for positioning the annealing chamber in operative relationship to the first cooling means.

A second cooling means is in the form of an annular zone, preferably being a continuous circumferential zone surrounding the molten tube at a point slightly spaced from the annealing chamber and in operative relationship therewith to permit a molten annular tube to pass therethrough. To this end, according to a preferred construction, the secondary cooling means comprises a housing having upper and lower apertures therein of a diameter sufficient to permit a molten tube to pass therethrough, means for supplying a source of a cooling gaseous medium to said housing, and means within said housing for directing said gaseous cooling medium preferably in the direction of movement of the annular molten tube. Desirably, the last-mentioned means is adjustable to permit variances in the direction of the gaseous medium onto the tube. Suitable means may be provided for mounting the second cooling means as, for example, brackets, etc.

The source of the gaseous cooling medium may be provided for by conventional means, e.g. compressed air, which may be refrigerated if desired. The compressed air may be provided at varying velocities ranging from 1000 to 4000 feet per minute. Most desirably, in the first and second cooling means the gaseous cooling medium is supplied to the annular housing in the form of a circumferential ring, by means of a plurality of individual flow streams, to form a substantially continuous annular curtain of the cooling medium.

The type of equipment used in the extrusion of the film-forming extrudable resin and for maintaining the bubble in a blown condition, may be any suitable equipment known in the art for this purpose. In the case of single tube extrusion—that is non-laminated films, a single extruder is required to feed a molten resin to an annular extrusion die. The extrusion die may be a single channel conventional type of alternatively, may be a multi-channel type adapted to form a co-extruded tube consisting of two or more layers of film-forming extrudable resin. In the latter type of die arrangements, a single extruder with dual feed lines may be employed, or two or more extruders feeding different types of resins can also be employed to produce a co-extruded product having different properties depending on the different types of resins extruded.

The products of the present invention have superior properties to those which could otherwise be produced on the conventional blown tube type of process and apparatus. It is now possible to produce much better "balanced" film and tubing having excellent haze and gloss percentages, tensile strength averages, secant modulus and impact strength characteristics without sacrificing an improvement in one property for another. Moreover, the characteristics of such shrink film are improved. In the case of polyethylene of low density type, it is now possible to produce tubing or film having balanced properties where haze percentages of 3 to 4% (measured by ASTM D-100-3-61) may be obtained, gloss percentages of between 115 to 130 (measured by ASTM D-523-53T), tensile strengths between 2800 to 3000 or more and impact strengths of between 68 to 70 grams/mil (for one mil film), and shrink characteristics where the machine direction:transverse direction ratio is between about 2:1 to about 1.5:1.

More over, with the present invention, it is now possible to produce polyethylene film or tubing in which the morphology of the material is based on x'lytes surrounded by amorphous areas with substantially no crystalline formation therein. The products are further characterized in that the film or tubing is in a substantially "relaxed" condition—in other words, there are no over-balanced stress-strain factors in a dormant form.

In carrying out the process of the present invention, improved characteristics can be obtained in a wide variety of films or tubing produced from different film-forming extrudable resins. Likewise, improved characteristics may be obtained in films or tubing consisting of two or more layers of coextruded materials. To this end, the process may employ typical film-forming thermoplastic resins, or laminates of one or more of the following resins, polyethylene (all densities), polypropylene, copolymers of polyethylene with other comonomers, copolymers of polypropylene with other comonomers, cellulose acetate, cellulose acetate butyrate, ethyl cellulose, methyl methacrylate polymer, nylon (extrusion or molding grade) polystyrene, polyvinyl formal-acetate butyral, copolymers of vinyl chloride and vinyl acetate (Vinylite), polyvinyl chloride (Geon), copolymers of vinyl chloride and vinylidene chloride (Saran) etc.

The resins employed may contain various types of conventional additives according to standard practices in this art, such additives being for example anti-block, anti-slip, etc. The present invention, as indicated, is particularly suitable for the production of film by the blown tube method; however, the tubing may be split during production thereof, whereby continuous film is obtained. The thickness of the extruded tube may vary according to conventional procedures and requirements—typical thicknesses ranging from .0005 inch and lower to several mils, e.g. 7 to 10 mils or more.

Having thus generally described the invention reference will now be made to the accompanying drawings illustrating a preferred embodiment and in which FIG. 1 is a schematic view of an apparatus according to the present invention; and FIG. 2 is a diagrammatic view showing the condition of the molten bubble as it passes through the cooling and annealing chambers.

In FIG. 1, various components of a typical extrusion line have not been shown for the sake of simplicity. Such components are, for example, the extruder and the wind-up roll, etc.

Reference numeral 10 designates a supply conduit having a channel 12 therein for receiving molten resin extruded from an extruder, which connects to an extrusion die indicated generally by reference numeral 14. The extrusion die may be any conventional die such as a rotational die, or a stationary die. The size of the die will vary according to techniques and practices in this art. As previously mentioned, the die may be a co-extrusion die adapted to extrude two or more layers of molten material; and for simplicity only, a single layer extrusion die has been illustrated.

The die illustrated includes an aperture 15 for receiving the molten material from the conduit 12 and thereafter divides into an annular orifice channel 16 to form an annular ring of extruded resin at the discharge end 16a of the die. A conically shaped solid core 18 supported by a "spider," is positioned in the central portion of the die thereby to form the annular channel 16 with the exterior walls of the die.

It will be understood that the molten resin is introduced into the die under pressure which may be according to the conventional techniques. In the blown bubble method, a source of pressurized air is introduced into conduit 20 to air line 22 extending to the conical member 18 to direct a jet of air upwardly which is surrounded by the annular ring of film being extruded.

Spaced from the die 14 at a predetermined vertical height therefrom are a pair of rotatable rollers 24 mounted on drive shafts 26, driven by suitable means. It is at this point that the bubble or tube, inflated by the source of pressurized air, is collapsed to form a collapsed tube 28 which is then wound up on wind-up rollers (not shown).

The inflated bubble, generally designated by reference numeral 30, is maintained in an inflated condition by adjustment of the air pressure and other factors as will be understood by those skilled in this art.

Once extruded from the die, the bubble or tube which is in a molten condition, solidifies at what is known as a "frost-line" in the art, shown by dotted lines 32.

In accordance with this invention, the first cooling step is carried out by providing a first cooling means, preferably in the form of an air ring designated by reference letter A. The annealing chamber is generally designated by reference letter C and the second cooling step is carried out by second cooling means, preferably in the form of a second air ring generally designated by reference letter B. In a preferred embodiment, both cooling means are of a substantially similar construction, and in the following description similar reference numerals designate similar components.

Each cooling means comprises an air ring having a housing 40 forming an enclosed chamber. Housing 40 includes an aperture 42 therein, which aperture is of a size sufficient to permit a molten extruded blown tube to pass therethrough, as will be evident from FIG. 1.

The housing 40 includes an internal wall 44, otherwise known as a chimney. Depending on the particular construction of the air ring, the height of the chimney 44 may vary, and may be adjustably mounted on the housing to vary the angle between the bubble and the chimney. In the arrangement shown, chimney 44 of ring A is commensurate with the height of the housing, while in the case of ring B, the chimney 44 extends beyond the housing 40.

Each air ring includes a circumferential air passage designated by reference numeral 46, connected to a source of pressurized air, not shown) which is introduced therein by means of a conduit 49. Air ring A also includes an adjustable air discharge opening or nozzle 48; air ring B includes a similar nozzle 50. The adjustment of the nozzle permits the flow of gaseous cooling medium to be directed at a desired angle onto the external surface of the molten film.

Air ring A may be mounted to the extrusion apparatus by suitable means; in the arrangement shown, it is connected to the die; and air ring B may be mounted by means of brackets to the extrusion assembly.

The above-described air rings A and B are of a type known as a "venturi" type of air ring which because of their structure and operation, permit a molten bubble to expand outwardly. The expansion of the bubble, particularly during the second cooling step imparts additional stability to the bubble to permit an increased extrusion rate. However, the bubble may be acted on to cause expansion according to various other techniques.

The annealing chamber, indicated by reference numeral C, is mounted between air rings A and B, spaced-apart therefrom by a distance of about 4 inches. The chamber comprises housing 52, having a conduit 54 connected thereto at one end and at the other end to a vacuum source—e.g. a vacuum pump. The annealing chamber acts to draw the sensible heat surrounding the molten bubble or tube at this point, so as to permit the molten material to be annealed during this phase of the tube production. In using an annealing chamber of the type illustrated, the tube is also permitted to expand whereby the x'lytes formed following the initial cooling step, may be further stretched.

As illustrated in FIG. 2, without the annealing chamber of the type described, the bubble would otherwise assume the configuration shown in dotted lines. This further expansion of the bubble also imparts additional stability.

EXAMPLE

The following example demonstrates the production of a novel polyethylene product, using the process and apparatus of the present invention. In this example there was employed a polyethylene resin of low density; the extrusion apparatus employed was that illustrated in FIG. 1. In this case, the extruder was a standard 2¼ inch 24:1 LD extruder connected to a 5-inch spider type die. The first cooling means was as shown in the drawings, having a diameter of about 8 inches; the second cooling means was also as shown in the drawings having an aperture therein of approximately 14 inches. The height of the first and second cooling means was 5 inches each. The annealing chamber had a height of 3 inches, and was spaced from each of the cooling rings by a distance of 4 inches. The gap between the annealing chamber and the cooling rings was closed by means of a sheet of film.

The polyethylene resin with the conventional additives therein, e.g. anti-block, was fed to the extruder and a bubble formed according to conventional procedures. The polyethylene had a melt temperature of about 340° F., and was extruded from the extrusion die at this temperature. The extrusion conditions were adjusted to provide a film thickness above the frost line of approximately 1.2 mils average.

The first cooling means was actuated to supply air as a gaseous cooling medium under medium velocity (of 1000 feet per minute), and was directed against the film at a slight angle. During this initial cooling stage, as will be seen from FIG. 2, the molten bubble began to expand, and the temperature of the molten bubble was lowered to about 295° F. At this temperature, x'lytes began to form in the molten bubble, which x'lytes were stretched due to the expansion of the bubble during the first cooling step. Thereafter, the bubble was passed through the annealing chamber whereby the temperature of the bubble maintained at about 290° F., and as will be seen the bubble completed the first stage expansion whereby it had a blow ratio of approximately 1.7.

Following annealing, the molten bubble was then passed through the second cooling step wherein cool air was directed at a slight angle onto the molten tube to lower its temperature to about 160–180° F. Because of the type of second cooling means, further expansion of the bubble was carried out to a desired blow ratio size of 3.5—i.e. during the second expansion step, the blow ratio was 1.8 over and above the original blow ratio.

The frost line of the material was approximately 26 inches above the die and extrusion was carried out at about 160 feet per minute.

It was found that the product obtained had substantially no crystalline sites in the material, but rather, consisted of a x'lyte population surrounded by amorphous areas. The x'lyte population, due to stretching, was expanded to provide a more or less uniform product.

The characteristics of the product were tested and it was found that the haze percentage, as measured by ASTM test D-1003-61, was about 3.5%, the gloss percentage, as measured by ASTM test D-523-53T was 128%, the tensile strength average (of the machine and transverse directions) was 3250 p.s.i., based on a machine direction strength of 3500 and a transverse direction strength of 3000, and an elongation percentage of 575%. The secant modulus of the film was 30,000 based on an average of machine and transverse directions, and the film had an impact strength of 68 grams per mil (based on a one mil sample). As will be seen such products possess vastly superior strength, optical and shrink characteristics compared to conventional prior art products, and the products were eminently suitable for high quality shrink film with substantially no distortion to printed indicia. Moreover, the product was also eminently suitable for high gloss wrappings for special products—e.g. bread, etc.

Additional tests were carried out using various types of ethylene copolymers and it was found that increases in the shrink, gloss, haze, etc. could be obtained over conventional products.

It will be understood that various modifications can be made to the invention without departing from the spirit and scope thereof.

We claim:

1. In a method of producing film or tubing by the blown tube process wherein an extrudable crystallizable film-forming thermoplastic resinous material is extruded to form a molten tube or bubble, and wherein the molten extruded tube or bubble is blown up to a desired size following extrusion; the improvement comprising the steps of cooling the molten tube following extrusion and during expansion thereof to cool the molten tube to a temperature above the crystallization formation temperature of the material but at a temperature at which said tube remains in a molten condition and sufficient to permit the formation of crystallites in said material passing the tube through a substantially enclosed chamber defining an annealing zone while maintaining a vacuum in said chamber thereby annealing the molten tube at a temperature sufficient to withdraw sensible heat therefrom and for a time sufficient to continue the formation of crystallites and to permit the material to form amorphous areas therein, and thereafter quenching the resulting molten annealed tube to solidify said material to a substantially amorphous state substantially without crystal formation therein to produce a film or tube chharacterized by amorphous material with crystallites dispersed throughout the material in the amorphous areas and which is substantially free of crystalline material.

2. A method as defined in claim 1, wherein the tube is maintained at a temperature, during the initial cooling step and the annealing step, between 30° F. below the temperature at which the material is extruded to above the crystallization formation temperature of said material.

3. A method as defined in claim 1, wherein said material is polyethylene or a co-polymer thereof, said material is maintained at a temperature of between about 290° F. to about 320° F. during the initial cooling step and the annealing step.

4. A method as defined in claim 1, wherein the minimum blow ratio of the tube is at least about 2.5.

5. A method of producing film by the blown tube process, said method comprising:
   extruding an extrudable crystallizable film-forming thermoplastic resinous material to form a molten tube,
   creating a differential air pressure between the tube and the atmosphere external thereto to expand the tube to a desired size following extrusion,
   passing the molten tube through a cooling zone following extrusion and during expansion thereof to cool the molten tube to a temperature above the crystallization formation temperature of the material said temperature being a temperature at which said tube remains in a molten condition and being sufficient to permit the formation of crystallites in said material,
   subsequently passing the tube which is still in a generally molten state through an annealing zone, defined by a substantially enclosed chamber,
   subjecting the molten tube to a partial vacuum while it is in said annealing zone and withdrawing sensible heat from said tube as it passes through said annealing zone by providing a temperature in said annealing zone within the range of about 30° F. below to about 100° F. below the temperature of the material during extrusion, said temperature being at least sufficient to effect withdrawal of sensible heat from said material,
   subjecting the material passing through said annealing zone to said temperature for a time sufficient to continue the formation of crystallites and to permit the material to form amorphous areas, therein,
   and thereafter passing the resulting molten annealed tube through a quenching zone where the temperature of the material is further reduced to solidify said material to a substantially amorphous state substantially without crystal formation therein and prevent further crystallite formation therein to thereby produce a tube characterized by amorphous material with a substantial amount of crystallites dispersed throughout the material in the amorphous areas and which is substantially free of crystalline material.

6. A method, as defined in claim 5, which includes the step of collapsing the tube upon solidification thereof.

7. A method as defined in claim 5, wherein the tube is maintained at a temperature, during the initial cooling step and the annealing step, between 30° F. below the temperature at which the material is extruded to above the crystallization formation temperature of said material.

8. A method as defined in claim 5, wherein said material is polyethylene or a co-polymer thereof, said material is maintained at a temperature of between about 290° F. to about 320° F. during the initial cooling step and the annealing step.

9. A method as defined in claim 5, wherein the minimum blow ratio of the tube is at least about 2.5.

10. A method of producing film of polyethylene or co-polymers thereof by the blown tube process, said process comprising:
    extruding an extrudable crystallizable film-forming thermoplastic resinous material of polyethylene or copolymers thereof at a temperature within the range of about 320° F. to about 350° F. to form a molten tube,
    creating a differential air pressure between the tube and the atmosphere external thereto to expand the tube to a desired size following extrusion so that the tube has a combined minimum blow ratio of at least 2.5,
    passing the molten tube through a cooling zone following extrusion and during expansion thereof,
    subjecting said tube to a temperature in said cooling zone which is within the range of about 290° F. to about 320° F. but above the crystallization formation temperature of the material to thereby cool the molten tube to a temperature above the crystallization formation temperature of the material but still at a temperature at which said tube remains in a molten condition and sufficient to permit the formation of crystallites in said material,
    subsequently passing the tube which is still in a generally molten state through an annealing zone formed by a substantially enclosed chamber,
    subjecting the molten tube to a partial vacuum in the annealing zone withdrawing sensible heat from said material while in said annealing zone by providing a temperature in said annealing zone within the range of about 30° F. to about 100° F. below the temperature of the material during extrusion and said temperature being sufficient to effect withdrawal of sensible heat from said material,
    subjecting the material to this temperature for a time sufficient to continue the formation of crystallites and to permit the material to form amorphous areas therein,
    and thereafter quenching the tube by passing the resulting molten annealed tube through a quenching zone in which the temperature of the material is further reduced to solidify said material to a substantially amorphous state substantially without crystal formation therein and prevent further crystallite formation, to thereby produce a tube characterized by amorphous material with a substantial amount of crystallites dispersed throughout the material in the amorphous areas and which is substantially free of crystalline material.

References Cited

UNITED STATES PATENTS

| | | | |
|---|---|---|---|
| 3,568,252 | 3/1971 | Masuda et al. | 264—95 |
| 3,423,274 | 1/1969 | Lahm et al. | 264—346 |
| 2,763,029 | 9/1956 | Tulloss, Jr. | 264—95 |
| 2,961,711 | 11/1960 | Diedrich et al. | 264—346 |
| 3,243,486 | 3/1966 | Pilaro | 264—95 |

ROBERT F. WHITE, Primary Examiner

J. R. THURLOW, Assistant Examiner

U.S. Cl. X.R.

264—95, 101, 237, 348, Dig. 78